United States Patent
Meid (10) Patent No.: US 7,737,645 B2
(45) Date of Patent: Jun. 15, 2010

(54) ELECTRONIC TRIPPING UNIT FOR A MOTOR-CIRCUIT BREAKER OF AN ELECTRIC MOTOR

(75) Inventor: Wolfgang Meid, Muelheim-Kaerlich (DE)

(73) Assignee: Eaton Industries GmbH, Bonn (DE)

( * ) Notice: Subject to any disclaimer, the term of this patent is extended or adjusted under 35 U.S.C. 154(b) by 82 days.

(21) Appl. No.: 12/282,628

(22) PCT Filed: Mar. 12, 2007

(86) PCT No.: PCT/EP2007/052283

§ 371 (c)(1),
(2), (4) Date: Sep. 11, 2008

(87) PCT Pub. No.: WO2007/104733

PCT Pub. Date: Sep. 20, 2007

(65) Prior Publication Data

US 2009/0027814 A1 Jan. 29, 2009

(30) Foreign Application Priority Data

Mar. 14, 2006 (DE) ........................ 10 2006 011 713

(51) Int. Cl.
*H02P 1/54* (2006.01)
(52) U.S. Cl. ........................ 318/34; 318/782
(58) Field of Classification Search .............. 318/34, 318/782; 361/94, 87, 31; 307/141.4
See application file for complete search history.

(56) References Cited

U.S. PATENT DOCUMENTS

| 4,819,125 A | 4/1989 | Arinobu et al. |
| 5,428,495 A | 6/1995 | Murphy et al. |
| 6,542,345 B1 * | 4/2003 | Bauer ........................ 361/94 |
| 2004/0140779 A1 * | 7/2004 | Diesner et al. ................ 318/34 |

FOREIGN PATENT DOCUMENTS

| DE | 1089863 | 9/1960 |
| DE | 1961686 | 6/1971 |
| DE | 3784927 | 10/1993 |
| DE | 19802831 | 8/1998 |
| DE | 69323680 | 9/1999 |
| EP | 0019904 | 12/1980 |

OTHER PUBLICATIONS

International Search Report for International No. PCT/EP2007/052283 mailed on Sep. 25, 2007.

* cited by examiner

*Primary Examiner*—Karen Masih
(74) *Attorney, Agent, or Firm*—Leydig, Voit & Mayer Ltd.

(57) ABSTRACT

An electronic trip unit for a motor circuit breaker of an electric motor includes at least one detection unit configured to sense at least one current that is delivered to the electric motor. The unit further including a discriminator circuit, the discriminator circuit being in a first state when no measured current value exceeds a predefined trip threshold, and being in a second state when at least one measured current value exceeds the predefined trip threshold. The discriminator circuit includes an output for controlling the motor; a voltage-limiting component having a breakdown voltage; a resistor; and a switching unit configured to, in the first state, switch the control signal to the first level, and, in the second state, switch the control signal to the second level, the switching unit being configured to be switched by a voltage drop across the resistor.

18 Claims, 3 Drawing Sheets

ELECTRONIC TRIPPING UNIT FOR A MOTOR-CIRCUIT BREAKER OF AN ELECTRIC MOTOR

CROSS REFERENCE TO PRIOR APPLICATIONS

This application is a U.S. National Phase application under 35 U.S.C. §371 of International Application No. PCT/EP2007/052283, filed Mar. 12, 2007, and claims benefit to German Patent Application No DE 10 2006 011 713.1, filed Mar. 14, 2006. The International Application was published in German on Sep. 20, 2007 as WO 2007/104733 under PCT Article 21 (2).

FIELD

The present invention relates to an electronic trip unit for a motor circuit breaker of an electric motor having at least one detection unit for sensing at least one measured current value of at least one current that is delivered to the electric motor.

BACKGROUND

Motor circuit breakers protect electric motors by thermally tripped shutoff prior to overloading. They are generally combined with electromagnetic fast trippers, and intended primarily for three-phase rotary-current motors.

Motor circuit breakers can have a setting range for setting the nominal current of the electric motor, the nominal current range extending from a minimum settable nominal current $I_{nenn,min}$ to a maximum settable nominal current $I_{nenn,max}$, and the nominal current $I_{nenn}$ that is set being within this nominal-current range.

Thermal protection is generally effected via bimetals that are heated by heating coils through which the motor current flows. If the power consumption of even one winding of the motor exceeds the predetermined value for several seconds, the bimetal becomes deformed by the heat and trips a trip unit of the motor circuit breaker, and interrupts the power circuit to the motor.

The electromagnetic fast tripper, on the other hand, causes an immediate shutoff in the event of a short circuit in the motor supply lead or a winding fault; typically, the electromagnetic fast tripper responds, and performs the fast trip, only above 14 times the maximum settable nominal current.

The use of bimetals in motor circuit breakers has the disadvantage that the setting range of the nominal current of the motor circuit breaker is greatly limited. The setting range of the nominal current can be expanded by replacing the bimetals with an electronic system in which the currents delivered to the motor are sensed by a current transformer, and shutoff of the motor takes place as a function of the sensed currents.

The current transformer is, as a rule, a transformer whose primary winding has passing through it an alternating current delivered to the electric motor, and in whose secondary circuit the transferred current is sensed. This transformer principle has the disadvantage, however, that the transformer core goes into saturation when the primary current exceeds a certain value. Current transformers typically go into saturation above about 8 times the maximum settable nominal current $I_{nenn,max}$. Current transformers that go into saturation only at higher currents are significantly more cost-intensive and are physically larger. Saturation changes the sinusoidal secondary-side current signal, and spikes occur in the current signal, so that an effective-value calculation of the current using an A/D converter is possible only at a very high sampling rate.

In the region from 8 to 14 times the maximum settable nominal current $I_{nenn,max}$, the motor circuit breaker can thus, longer sense the current delivered to the motor, and trip the motor, using an A/D converter having a low sampling rate. The sampling rate of the A/D converter would need to be greatly increased for correct current sensing in this region. This entails the disadvantage that this A/D converter having an elevated sampling rate requires more outlay for implementation, and thus causes higher costs and has a physically larger size. A further disadvantage is the fact that the higher sampling rate of the A/D converter causes higher dissipated power consumption.

SUMMARY

In an embodiment, the present invention provides an electronic trip unit for a motor circuit breaker of an electric motor. The unit includes at least one detection unit configured to sense at least one current that is delivered to the electric motor so as to provide at least one corresponding measured current value. The unit further includes a discriminator circuit, the discriminator circuit being in a first state when no measured current value of the at least one measured current value exceeds a predefined trip threshold, and the discriminator circuit being in a second state when at least one measured current value of the at least one measured current value exceeds the predefined trip threshold. The discriminator circuit includes an output configured to output a control signal for controlling the motor; a voltage-limiting component having a breakdown voltage, the predefined trip threshold being determined by the breakdown voltage; a resistor connected in series with the voltage-limiting component; and a switching unit configured to, in the first state, switch the control signal to the first level, and, in the second state, switch the control signal to the second level, the switching unit being configured to be switched by a voltage drop across the resistor.

BRIEF DESCRIPTION OF THE DRAWINGS

The present invention will be further explained below with reference to drawings that show exemplifying embodiments. In the drawings.

DETAILED DESCRIPTION

The present invention is directed to an electronic trip unit for a motor circuit breaker, in which unit an overcurrent to a motor can be detected with simple means even when, for example, the current transformer goes into saturation and an effective-value calculation of the current delivered to the motor is therefore no longer possible, so that a fast trip in order to shut off the electric motor can be performed even with the current transformer in saturation mode.

In an embodiment according to the present invention, the electronic trip unit for a motor circuit breaker of an electric motor includes at least one detection unit for sensing at least one measured current value of at least one current that is delivered to the electric motor; and includes a discriminator circuit having an output for outputting a control signal for controlling the motor, the discriminator circuit being in a first state when no measured current value of the at least one measured current value exceeds a predefined trip threshold, and the discriminator circuit being in a second state when at least one measured current value of the at least one measured current value exceeds the predefined trip threshold; and the discriminator circuit, in the first state, setting the output signal to a first level and the discriminator circuit, in the second state, setting the output signal to a second level; and the discriminator circuit including a voltage-limiting component, and the predefined trip threshold being determined by the breakdown voltage of the voltage-limiting component.

The trip threshold can be selected, for example, so that the discriminator circuit switches into the second state, and sets the output signal to the second level, when the motor has conveyed to it a current that is, for example, more than 8 times the maximum settable nominal current, so that the discriminator circuit sets the output signal to the second level when at least one of the at least one sensed measured current value has a value that is more than 8 times the maximum settable nominal current of the electric motor. The discriminator circuit thus acts as a threshold value detector. The voltage-limiting component can be, for example, a Zener diode.

The output signal of the discriminator circuit can be read in, for example, from a further processing unit such as, for example, a microcontroller, so that said further processing unit detects, on the basis of the level of the output signal, whether a shutoff of the electric motor is to be carried out, and then, for example, triggers a tripping means to interrupt current delivery to the electric motor. The output signal can also, however, be connected directly to the tripping means, so that the tripping means is triggered by the output signal and interrupts current delivery to the electric motor when the output signal exhibits the second level.

If the voltage-limiting element is realized, for example, by way of a Zener diode, the Zener diode is then connected in such a way that the Zener diode is operated in the reverse direction and the breakdown voltage of the Zener diode determines the trip threshold, so that the Zener diode is operated in the breakdown region when at least one of the at least one sensed measured current value exceeds the trip threshold. The Zener diode becomes low-impedance as a result, and a current flowing through the Zener diode sets the output signal of the discriminator circuit to the second level, whereas conversely the output signal of the discriminator circuit is set to the first level when the Zener diode blocks and no current flows through the Zener diode. The discriminator circuit is thus in the first state when the Zener diode is not being operated in the breakdown region, while the discriminator circuit is in the second state when the Zener diode is operating in the breakdown region. The trip threshold can thus be predefined by means of the breakdown voltage of the Zener diode, the breakdown voltage being modifiable by selecting the Zener diode possessing the desired breakdown voltage. The Zener diode thus acts as a threshold value detector.

If the electric motor is realized, for example, by way of an alternating-current motor, at least one of the at least one detection unit can then be, for example, an inductive current transformer such as, for example, a transformer that has the first current to be sensed flowing through its primary side and on whose secondary side the transformed first current is converted into the voltage present at the output of the first detection unit. This conversion can be accomplished, for example, by way of a shunt resistor.

The apparatus according to an embodiment of the present invention thus presents the advantage that with no measurement of the at least one measured current value, which measurement might occur e.g. by way of a voltage meter when the at least one measured current value is represented by a voltage, the exceedance of a predefinable trip threshold of at least one of the at least one measured current value can be detected and, for example on the basis of said detection, a fast trip and, associated therewith, a shutoff of the electric motor can be performed. This apparatus functions reliably even when, for example, a current transformer in one of the at least one detection unit is in saturation, and the measured current value associated therewith is represented by a voltage that exhibits voltage spikes because the current transformer is in saturation, and that therefore cannot be sensed by, for example, an A/D converter having a low sampling rate.

The present invention can also be used, however, to detect an overcurrent in direct-current motors. Here at least one of the at least one detection unit can be, for example, a resistor that is present in the current supply lead to the motor, so that the first current flows through the resistor and the voltage drop across the resistor is present at the output of the first detection unit; further, at least one of the at least one detection unit can be realized, for example, by way of a magnetic-field converter, so that a voltage proportional to the measured magnetic field and thus to the first current is present at the output of the first detection unit; said magnetic-field converter can be realized, for example, by way of a Hall converter.

An embodiment of the present invention provides that the discriminator circuit includes a switching unit that in the first state switches the output signal to the first level, and in the second state switches the output signal to the second level.

The switching unit can be connected to the voltage-limiting component in such a way that a current flowing through the voltage-limiting component triggers the switching unit so that the switching unit switches the output signal to the second level when the voltage-limiting component is in breakdown mode, and conversely the switching unit switches the output signal to the first level when no current, or only a small current, flows through the voltage-limiting component. The switching unit can include, for example, a relay and/or a transistor.

An embodiment of the present invention provides that the switching unit includes a transistor.

The transistor can be realized, for example, by way of a field effect transistor, such that either a barrier-layer FET, a depletion MOSFET, or an enhancement MOSFET can be used. The field effect transistor can be realized by way of both an n-channel or a p-channel type. In addition, a bipolar transistor, which can be either an npn or a pnp type, can also be used for the switching unit. The switching unit can, moreover, also includes more than one transistor.

An embodiment of the present invention provides that the transistor is a MOSFET.

An embodiment of the present invention provides that the discriminator circuit includes a resistor connected in series with the voltage-limiting component, and that the voltage drop across the resistor switches the switching unit.

With this embodiment of the present invention, the voltage-limiting component and the series-connected resistor thus act as a threshold value detector.

An embodiment of the present invention provides that a filter circuit is placed between the output of the discriminator circuit and a ground potential.

This filter circuit can have, for example, a low-pass characteristic, and can thus damp high-frequency portions of the output signal. This can be advantageous especially when switching over the level of the output signal, since voltage spikes can occur in this context that might disrupt downstream processing units such as, for example, microcontrollers. The voltage spikes are damped by the low-pass filter circuit. This low-pass filter circuit can be realized, for example, by way of a capacitor; a resistor can be located parallel to the capacitor.

An embodiment of the present invention provides that a voltage limiter is placed between the output of the discriminator circuit and a ground potential.

The voltage limiter can be realized, for example, by way of a Zener diode or Z-diode.

An embodiment of the present invention provides that the output of the discriminator circuit is connected to an input of a microcontroller, and the microcontroller is further connected to a tripping means for shutting off the electric motor, and the microcontroller shuts off the electric motor with the aid of the tripping means on the basis of the output signal of the discriminator circuit.

The tripping means can act as an energy storage device that acts on a switching latch, can be embodied as an electronic auxiliary switch or as an electronic switching means such as a semiconductor switch, and can trip a circuit interrupter such as, for example, a contactor, so that the at least one current delivered to the motor is interrupted. The microcontroller reads in the output signal of the discriminator circuit and trips the tripping means in order to shut off the motor when the output signal exhibits the second level.

An embodiment of the present invention provides that shutoff of the electric motor takes place in a time span of less than approximately 200 ms.

This shutoff within a time span of less than 200 m is advantageous in particular when the trip unit according to the present invention is used to detect a short-circuit current delivered to the motor. In the context of such a short-circuit current, the motor is preferably shut off within less than approximately 200 ms in order to avoid damage to the motor and/or to the supply leads.

An embodiment of the present invention provides that the electric motor is an alternating-current motor.

The electric motor can be both a single-phase alternating-current motor to which exactly one phase current is delivered, but it can also be a multi-phase alternating-current motor such as, for example, a three-phase alternating-current motor.

An embodiment of the present invention provides that each of the at least one detection unit includes a current transformer having a primary side and a secondary side, through the primary side of which the current to be sensed flows, so that said primary-side current is converted on the secondary side to a transformed current, the sensed measured current value constituting a representative of the transformed current.

The transformed current can, for example, be converted into a voltage, so that said voltage represents the sensed measured current value and is thus representative of the transformed current. This voltage can be generated, for example, by a rectifier and a shunt resistor.

Current sensing thus takes place on the secondary side, so that detection of the current exceedance by the discriminator circuit occurs independently of the absolute value of the nominal current of the electric motor. On the primary side, different nominal-current ranges can be realized by way of different winding ratios of the current transformer. This has the advantage that the discriminator circuit need not be redesigned for every different nominal-current range.

The current transformer typically goes into saturation above a certain primary current value, so that above this certain primary current value, i.e. the saturation current value, the transformed current no longer depends linearly on the primary-side current and exhibits voltage spikes. The trip threshold of the discriminator circuit can be selected in such a way that the discriminator circuit switches into the second state when at least one of the at least one measured current value exceeds the saturation current value. This saturation current value is thus dependent on the current transformer and can lie, for example, at 8 times the maximum nominal current of the nominal-current range.

The trip unit according to an embodiment of the present invention thus presents the advantage that a shutoff of the electric motor can occur even above the saturation current value, even though the current transformer is in saturation and a primary-side effective-value calculation of the current delivered to the motor is not possible. This is advantageous in particular because the electromagnetic fast tripper of a motor circuit breaker typically trips only above 14 times the maximum nominal current, so that with the aid of the present invention, a shutoff can also be performed in the region between the saturation current value and 14 times the maximum nominal current. The saturation current value of the current transformer can typically be approximately 8 times the maximum nominal current. The trip unit according to the present invention therefore does not require a cost-intensive current transformer that goes into saturation only above 14 times the maximum nominal current, i.e. when the electromagnetic fast tripper shuts off; instead, current transformers that go into saturation earlier, and are more economical and also smaller in terms of physical size, can be used.

An embodiment of the present invention provides that a nominal-current range is allocated to the current transformer by way of the current transforming ratio between the primary side and the secondary side, and said nominal-current range is upwardly limited by a maximum nominal current $I_{nenn,max}$; and the predefined trip threshold is further predefined in such a way that the discriminator circuit switches into the second state when at least one measured current value of the at least one measured current value exceeds 8 times the maximum nominal current value $I_{nenn,max}$.

An embodiment of the present invention provides that for each of the at least one detection unit, the current transforming ratio between the primary side and the secondary side is settable in multiple steps, each step of the multiple steps respectively corresponding to a different primary-side nominal-current range in such a way that for each step of the multiple steps, the same current range results on the secondary side.

For example, the trip unit can include a rotary switch with which the different nominal-current ranges can be selected, such that for each of the detection units contained in the trip unit, the winding ratio is adapted to the selected nominal-current range.

An embodiment of the present invention provides that each of the at least one detection unit further includes the following means: a rectifier that is connected to the secondary-side output of the current transformer, for rectifying the transformed current; and a resistor that is connected between the rectifier and a ground point in such a way that the transformed and rectified current flows through the resistor and a voltage drops across the resistor, so that said voltage represents the sensed measured current value; and an output at which said voltage is present.

The rectifier can be realized by way of a single-path rectifier, or also by way of a multi-path rectifier.

The resistor can moreover be connected to the rectifier in such a way that with a positive first phase current through the first resistor, the voltage drop is negative.

An embodiment of the present invention provides that the rectifier is a bridge rectifier, and a second output of the bridge rectifier makes a supply voltage available.

An embodiment of the present invention provides that the discriminator circuit includes an input that is connected to the voltage-limiting component; and the output of each of the at least one detection unit is connected to the input of the discriminator circuit.

An embodiment of the present invention provides that at least two currents are delivered to the electric motor, and each of the at least two currents is sensed respectively by one of the at least one detection unit, so that the electronic trip unit includes at least two detection units; and a decoupling element is placed between the output of each of the at least two detection units and the input of the discriminator circuit.

According to this embodiment, the electric motor is a multi-phase electric motor such as, for example, a three-phase rotary-current motor (three-phase motor). Each of the phase currents delivered to the electric motor is sensed by a respective detection unit, each of the detection units including an output at which the respectively measured current value is present in the form of a voltage. This voltage can be negative with respect to ground. The decoupling element that is placed between the output of each of the detection units and the input of the discriminator circuit ensures decoupling of the individual detection units from one another, so that the respective voltages present at the outputs of the detection units do not influence one another.

An embodiment of the present invention provides that the decoupling element is a diode.

An embodiment of the present invention provides further that each of the at least one sensed measured current value is directed to the microcontroller, the microcontroller shutting off the electric motor, with the aid of the tripping means, on the basis of the at least one sensed measured current value and the nominal current of the electric motor.

The microcontroller can thus read in each of the at least one sensed measured current value, for example with the aid of at least one voltage meter when the at least one sensed measured current value is outputted by the respective detection unit in the form of a voltage. The microcontroller can thus monitor the motor based on the at least one sensed measured current value when the at least one sensed measured current value is a linear function of the respective current delivered to the motor, i.e. when the current transformer in the at least one detection unit is not in saturation. This is the case, for example, when the at least one primary-side current is below the saturation current value. The microcontroller can therefore detect in this context, for example, whether at least one of the at least one sensed measured current value is above a predefinable limit value, so that upon exceedance of said limit value a fast shutoff of the motor can be performed. This predefinable limit value can be, for example, 8 times the nominal current of the electric motor, such that the nominal current of the electric motor and/or the predefinable limit value can be inputted via an interface into the microcontroller.

Thus, for example, motor monitoring and any shutoff of the motor can be performed by the microcontroller when the primary-side currents are below the saturation current value, while the discriminator circuit authorizes a shutoff of the motor when one of the primary-side currents exceeds the saturation current value.

In addition, a family of characteristic curves for different tripping characteristic curves of the motor circuit breaker can be stored in the microcontroller, each of the characteristic curves indicating, for a respective degree of inertia $t_r$, the tripping time as a function of a current (normalized to the nominal current) delivered to the motor. The microcontroller can read in a predefinable degree of inertia $t_r$ through the interface, thereby select the corresponding tripping characteristic curve from the family of characteristic curves, and perform a delayed thermal shutoff of the motor on the basis of the at least one measured current value and the selected characteristic curve. The motor circuit breaker thus does not require bimetals for this thermal shutoff, so that both the thermal shutoff and the fast shutoff in the case of overcurrent or short circuit can be realized by way of the trip unit according to the present invention.

An embodiment of the present invention provides that the voltage-limiting component is a Zener diode.

Figure 1:
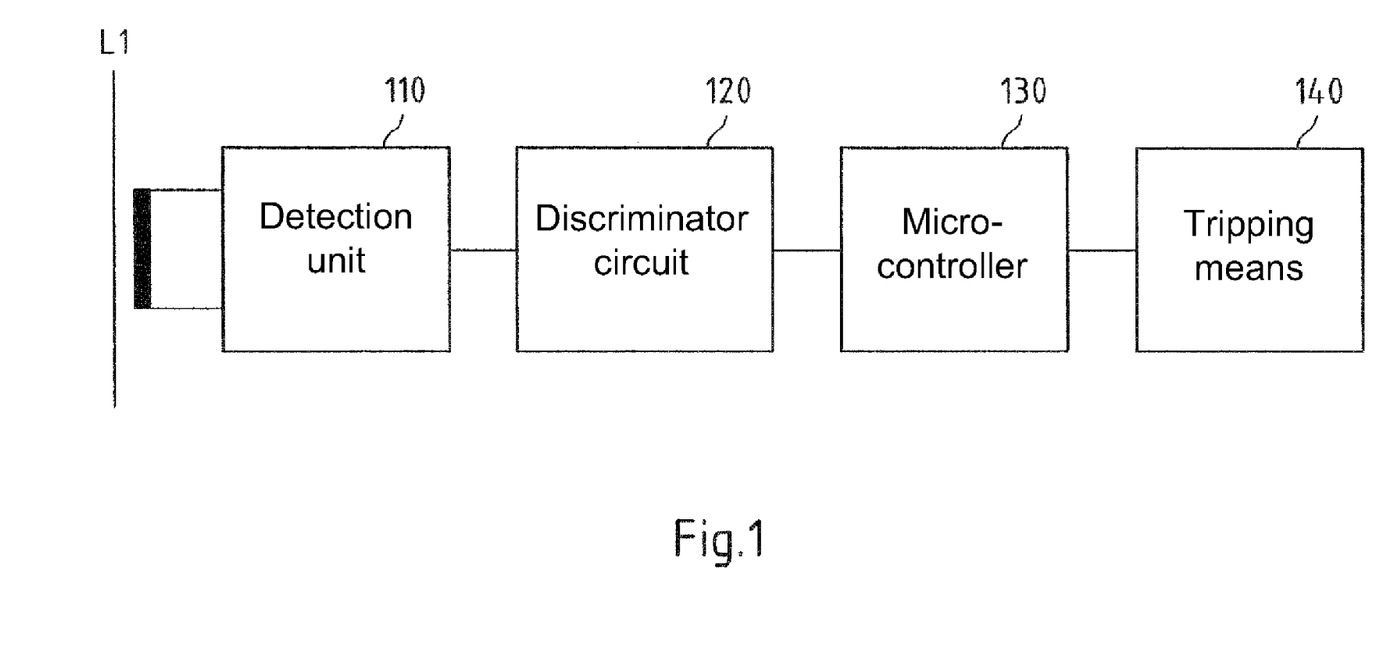
FIG. 1 is a schematic block diagram of an electronic trip unit according to an embodiment of the present invention for a motor circuit breaker.

The block diagram of FIG. 1 schematically depicts an embodiment of the electronic trip unit according to the present invention for a motor circuit breaker.

Detection unit 110 senses, by means of a current transformer, a current delivered to an electric motor, and conveys a measured current value to discriminator circuit 120. This measured current value can be represented, for example, by a voltage. The electric motor can be either a direct-current motor or an alternating-current motor. Discriminator circuit 120 includes a voltage-limiting component such as, for example, a Zener diode; the breakdown voltage of the voltage-limiting component defines a trip threshold, and the discriminator circuit sets the output signal to a first level when the sensed measured current value is below the trip threshold, and further sets the output signal to a second level when the sensed measured current value is above the trip threshold. The output signal is directed for further processing to a microcontroller 130 that, with the aid of tripping means 140, shuts off the electric motor when the output signal exhibits the second level.

It is thus possible, with the electronic trip unit according to the present invention, to detect whether a current delivered to the motor exceeds a predetermined value, so that the motor is shut off upon exceedance of said value.

One possible realization of detection unit 110 and discriminator circuit 120 is described with reference to the following further exemplifying embodiment.

Figure 2:
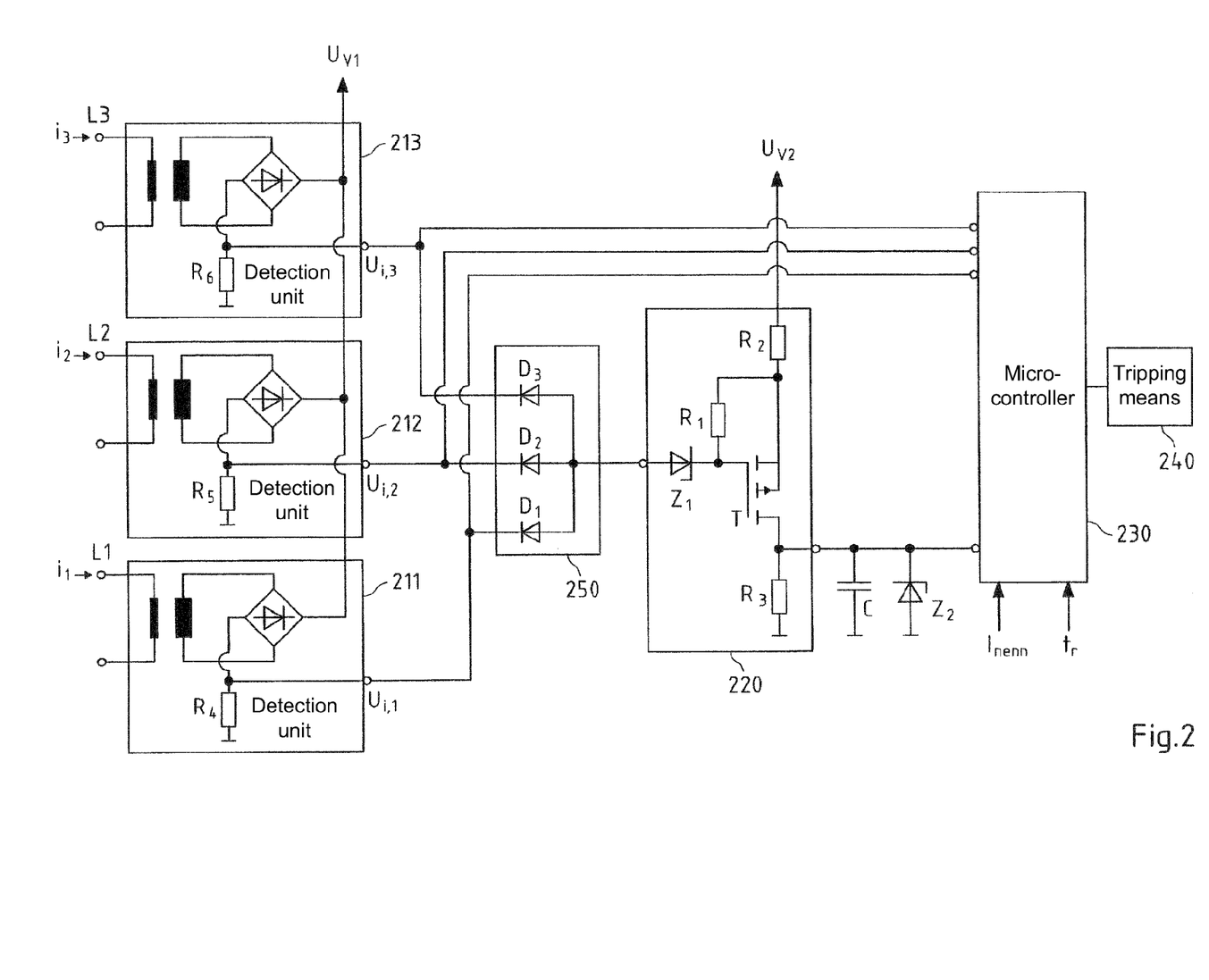
FIG. 2 shows another embodiment of an electronic trip unit according to the present invention for a motor circuit breaker.

FIG. 2 shows the construction of an electronic trip unit according to the present invention for a motor circuit breaker according to a further embodiment. The trip unit according to the present invention includes, in the exemplifying embodiment depicted, three detection units 211, 212, 213 for sensing the three phase currents $i_1$ delivered to the electric motor, a decoupling circuit 250, a discriminator circuit 220, a microcontroller 230, and a tripping means 240.

The manner of operation of each of the three detection units 211, 212, 213 will now be described with reference to first detection unit 211. These statements apply in the same fashion to the two further detection units 212 and 213.

First detection unit 211 senses the first positive current $i_1$ delivered to the electric motor, so that a negative voltage $U_{i,1}$ that depends on the sensed voltage $i_1$ is present at the output of first detection unit 211. As long as the current transformer contained in first detection unit 211 does not go into saturation, voltage $U_{i,1}$ is proportional to the sensed current $i_1$. The current transformer used in first detection unit 211 has only a small number of windings on the primary side, i.e. on the side through which current $i_1$ flows, whereas the number of windings on the secondary side is substantially higher. A higher primary-side current $i_1$ can thus be transformed into a smaller secondary-side current. The winding number ratio can advantageously be selected so that regardless of the particular current range to be sensed on the primary side (which depends on the particular electric motor being used, and on the nominal current of the electric motor), a constant current range results on the secondary side. The secondary-side circuit for threshold value detection thus need not be redimensioned for each different current range to be sensed on the primary side.

For example, the current transformer can be configured in such a way that different winding ratios can be tapped, and different nominal-current ranges can thus be implemented. By way of these different winding ratios, the current transformer can thus, for example, implement the following four nominal-current ranges:

|  | $I_{nenn,min}$ | $I_{nenn,max}$ |
|---|---|---|
| Nominal-current range I | 0.3 A | 1.2 A |
| Nominal-current range II | 1.0 A | 4.0 A |
| Nominal-current range III | 3.0 A | 12 A |
| Nominal-current range IV | 8.0 A | 32 A |

These nominal-current ranges can be settable, for example, by way of a rotary switch.

In nominal-current range III, for example, the nominal current on the electric motor is thus settable between the minimum nominal current $I_{nenn,min}$=3.0 A and the maximum nominal current $I_{nenn,max}$=12 A. The current transformer goes into saturation at approximately 8 times the maximum nominal current $I_{nenn,max}$, i.e. above the saturation current value of 96 A in the case of nominal-current range III.

As FIG. 2 shows, first detection unit 211 includes a bridge rectifier through which the transformed current $i_1$ flows. One output of the bridge rectifier represents supply voltage $U_{V,1}$, while another output of the bridge rectifier is connected via a resistor $R_4$ to ground. The transformed and rectified current $i_1$ thus flows through resistor $R_4$, so that negative voltage $U_{i,1}$ drops across resistor $R_4$ to ground, and said negative voltage $U_{i,1}$ is present at the output of the first detection unit. Negative voltage $U_{i,1}$ thus represents the first measured current value of the first current $i_1$ delivered to the motor. If current $i_1$ exceeds 8 times the maximum nominal current $I_{nenn,max}$ of the presently selected nominal-current range, i.e. if $i_1 > 8*I_{nenn,max}$, the current transformer then goes into saturation, and voltage $U_{i,1}$ is no longer proportional to current $i_1$ being sensed and can exhibit voltage spikes, so that current sensing by way of an effective-value calculation is no longer possible.

Analogously to first detection unit 211, second detection unit 212 senses second phase current $i_2$, so that negative voltage $U_{i,2}$ dependent on $i_2$ is present at the output of second detection unit 212; and third detection unit 213 senses third phase current $i_3$, so that negative voltage $U_{i,3}$ dependent on $i_3$ is present at the output of third detection unit 213. Second detection unit 212 and third detection unit 213 correspond, in terms of construction, to the first detection unit described above.

These three outputted negative voltages $U_{i,1}$, $U_{i,2}$, $U_{i,3}$ thus represent measured current values for phase currents $i_1$, $i_2$, $i_3$ delivered to the motor.

Because current sensing by way of an effective-value calculation based on the three outputted negative voltages $U_{i,1}$, $U_{i,2}$, $U_{i,3}$ is not possible above 8 times the maximum nominal current $I_{nenn,max}$ of the particular nominal-current range that is set, discriminator circuit 220 performs an overcurrent detection starting at 8 times the maximum nominal current $I_{nenn,max}$.

The output of each of the three detection units 211, 212, 213 is connected via a diode D1, D2, D3 to the input of discriminator circuit 220. The three diodes D1, D2, D3 that are contained in decoupling unit 250 each act in this context as decoupling elements, and prevent the outputs of the three detection units 211, 212, 213 from influencing one another.

Discriminator circuit 220 includes a voltage-limiting component, e.g. Zener diode Z1, MOSFET transistor T, and three resistors R1, R2, R3. Zener diode Z1 is placed between the input of discriminator circuit 220 and the gate of MOSFET transistor T. Located between the gate and source of MOSFET transistor T is resistor R1, which is thus connected in series with Zener diode Z1. Resistor R2 connects the source of MOSFET transistor T to a supply voltage $U_{V,2}$, and resistor R3 connects the drain of MOSFET transistor T to ground.

The breakdown voltage of Zener diode Z1 is selected so that when at least one of the three sensed measured current values $U_{i,1}$, $U_{i,2}$, $U_{i,3}$ exceeds 8 times the maximum nominal current $I_{nenn,max}$, i.e. when at least one of the three negative voltages $U_{i,1}$, $U_{i,2}$, $U_{i,3}$ falls below a voltage level corresponding to 8 times the maximum nominal current $I_{nenn,max}$, Zener diode Z1 is operated in the breakdown region and a current flows in the reverse direction through Zener diode Z1. This current thus also flows through resistor R1, so that the voltage drop across resistor R1 switches transistor T and a voltage drops across resistor R3; said voltage is thus present at the output of discriminator circuit 220. Discriminator circuit 220 is thus in the second state, and the voltage present at the output corresponds to the second level.

If none of the three sensed measured current values $U_{i,1}$, $U_{i,2}$, $U_{i,3}$ is above 8 times the maximum nominal current $I_{nenn,max}$, the breakdown voltage at Zener diode Z1 is not reached, so that no current flows through Zener diode Z1 being operated in the reverse direction, and also no current flows through resistor R1. Transistor T is then in the blocked state, so that no current flows through resistor R3, and a very low voltage level, or ground potential, is present at the output of discriminator circuit 220. Discriminator circuit 220 is thus in the first state, and the voltage present at the output corresponds to the first level.

The output of discriminator circuit 220 is connected to an input of microcontroller 230, a capacitor C and a second Zener diode Z2 being respectively connected between the output of discriminator circuit 220 and ground. Capacitor C acts, together with resistor R3, as a low-pass filter, and damps high-frequency components of the voltage present at the output of discriminator circuit 220. Second Zener diode Z2, operated in the reverse direction, acts as a voltage limiter.

The microcontroller thus senses the voltage level at the output of discriminator circuit 220 and carries out a fast shutoff of the electric motor, with tripping means 240, when the sensed voltage level corresponds to the second level, i.e. when discriminator circuit 220 has detected that at least one of the three currents $i_1$, $i_2$, $i_3$ delivered to the motor exceeds 8 times the maximum nominal current $I_{nenn,max}$. This fast shutoff occurs within approximately 200 ms.

In addition, microcontroller 230 also directly reads in the three sensed measured current values $U_{i,1}$, $U_{i,2}$, $U_{i,3}$ of the three detection units 211, 212, 213. If none of the three currents $i_1$, $i_2$, $i_3$ exceeds 8 times the maximum nominal current—which can be ascertained by microcontroller 230, for example, by the fact that discriminator circuit 220 sets its output to the first voltage level-microcontroller 230 can then perform motor monitoring, and any shutoff of the motor that may need to occur, on the basis of the three measured current values $U_{i,1}$, $U_{i,2}$, $U_{i,3}$.

A family of characteristic curves for one or several tripping characteristic curves of the motor circuit breaker can be stored for this purpose in microcontroller 230, each of the characteristic curves indicating, for a respective degree of inertia $t_r$, the tripping time as a function of a current (normalized to the nominal current) delivered to the motor. The microcontroller can read in a predefinable degree of inertia $t_r$, through an interface, thereby select the corresponding tripping characteristic curve from the family of characteristic curves, and execute a delayed thermal shutoff of the motor on the basis of the at least one measured current value and the selected characteristic curve. The motor circuit breaker thus requires no bimetals for this thermal shutoff, so that both thermal shutoff and fast shutoff (in the event of an overcurrent or short circuit) can be implemented by way of the trip unit according to the present invention. The family of characteristic curves can also be stored in an external memory that is connected to microcontroller 230.

Figure 3:
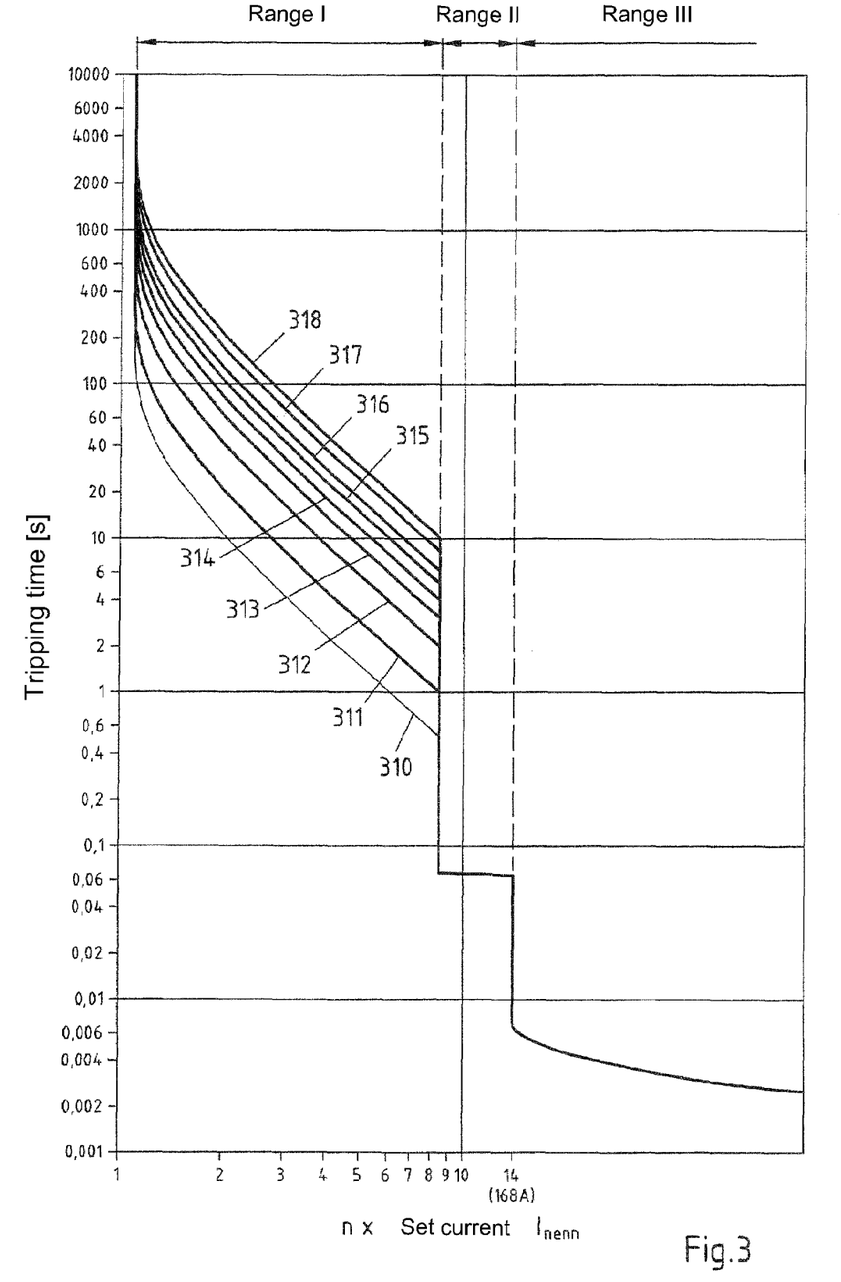
FIG. 3 shows the tripping and overload characteristic curves of an electronic trip unit according to an embodiment of the present invention for a motor circuit breaker.

FIG. 3 shows the tripping and overload characteristic curves 310 to 318 of an electronic trip unit according to the present invention for a motor circuit breaker, with reference to a family of characteristic curves; tripping time (s) is depicted as a function of an n-fold exceedance of the nominal current that is set ($n \times I_{nenn}$), i.e. the n-fold exceedance current that is set, each of the characteristic curves 311 to 318 being associated with a degree of inertia $t_r$ selected from $t_r[s]=(2, 4, 6, 8, 10, 12, 16, 20)$, while the lower characteristic curve 310 corresponds to a phase failure.

The nominal current $I_{nenn}$ that is set is preferably within the selected nominal-current range. In FIG. 3, the nominal current that is set is equal to the maximum nominal current of nominal-current range III, i.e. the electromagnetic fast tripper trips above 14 times the nominal current (14*12 A=168 A).

In range I the current transformer does not go into saturation, since the current delivered to the motor is below 8 times the maximum nominal current. In this range, microcontroller 230 can perform motor monitoring and motor shutoff on the basis of the three sensed measured current values $U_{i,1}$, $U_{i,2}$, $U_{1,3}$ of the three detection units 211, 212, 213. Microcontroller 230 can read in for this purpose, for example via an interface, a degree of inertia $t_r$ and the value of nominal current $I_{nenn}$, and can check on the basis of the characteristic curve associated with the degree of inertia whether a motor shutoff needs to be performed, and carry out said shutoff if applicable by means of the tripping means. If the nominal current $I_{nenn}$ that is set is below the maximum settable nominal current, microcontroller 230 can then, even in the region up to 8 times the maximum settable nominal current, detect on the basis of the sensed current values an exceedance of 8 times the settable nominal current, and authorize a fast trip. Only above 8 times the maximum settable nominal current does discriminator circuit 220, together with the microcomputer, then once again take over fast tripping.

In range II shown in FIG. 3, one of the current transformers is in saturation because 8 times the maximum nominal current has been exceeded, and discriminator circuit 220 according to the present invention recognizes the exceedance of 8 times the maximum nominal current and then sets the output signal to the second level, so that microcontroller 230, on the basis of the output signal of discriminator circuit 2230, carries out a fast shutoff of the electric motor.

In range III, on the other hand, i.e. above 14 times the maximum nominal current, the electromagnetic fast tripper of the motor circuit breaker, i.e. of a PKE, shuts off the motor.

The trip unit according to the present invention thus presents the advantage that a shutoff of the electric motor can occur even above saturation of the current transformer, i.e. in particular in range II, even though the current transformer is in saturation, and a primary-side effective-value calculation of the current delivered to the motor is not possible. This is advantageous in particular because the electromagnetic fast tripper of a motor circuit breaker typically trips only above 14 times the maximum nominal current, so that with the aid of the present invention a shutoff or fast shutoff can be performed even in the region between the saturation current value and 14 times the maximum nominal current, i.e. in range II.

The approach according to the present invention thus also presents the advantage that it is not necessary to use a current transformer that goes into saturation only above 14 times the maximum nominal current, but instead that current transformers that already go into saturation at 8 times the maximum nominal current, which are more economical and smaller in terms of physical size, can be used.

The trip unit according to the present invention also does not require A/D converters having an elevated sampling rate for current sensing in the region of 8 to 14 times the maximum settable nominal current $I_{nenn,max}$, which converters would be necessary in order to carry out an effective-value determination of the currents delivered to the motor despite the fact that the current transformers are in saturation, since the secondary-side current signal changes in this region and exhibits spikes. The voltage meters used in microcontroller 230 can thus be operated at a lower sampling rate, so that the power consumption of microcontroller 230 is lowered.

The present invention is not limited to the embodiments described herein; reference should be had to the appended claims.

The invention claimed is:

1. An electronic trip unit for a motor circuit breaker of an electric motor, comprising:
   at least one detection unit configured to sense at least one current that is delivered to the electric motor so as to provide at least one corresponding measured current value;
   a discriminator circuit, the discriminator circuit being in a first state when no measured current value of the at least one measured current value exceeds a predefined trip threshold, the discriminator circuit being in a second state when at least one measured current value of the at least one measured current value exceeds the predefined trip threshold, the discriminator circuit including:
      an output configured to output a control signal for controlling the motor;
      a voltage-limiting component having a breakdown voltage, the predefined trip threshold being determined by the breakdown voltage;
      a resistor connected in series with the voltage-limiting component; and
      a switching unit configured to, in the first state, switch the control signal to the first level, and, in the second state, switch the control signal to the second level, the switching unit being configured to be switched by a voltage drop across the resistor.

2. The electronic trip unit as recited in claim 1, wherein the switching unit includes a transistor.

3. The electronic trip unit as recited in claim 2, wherein the transistor is a MOSFET.

4. The electronic trip unit as recited in claim 1, further comprising a filter circuit coupled between the output of the discriminator circuit and a ground potential.

5. The electronic trip unit as recited in claim 1, further comprising a voltage limiter coupled between the output of the discriminator circuit and a ground potential.

6. The electronic trip unit as recited in claim 1, further comprising a microcontroller coupled to a tripping device and the output of the discriminator circuit, wherein the microcontroller is configured to shut off the electric motor via the tripping device based on the control signal.

7. The electronic trip unit as recited in claim 6, wherein the microcontroller is configured to shut off the electric motor in less than 200 ins.

8. The electronic trip unit as recited in claim 1, wherein the electric motor is an alternating-current motor.

9. The electronic trip unit as recited in claim 8, wherein the at least one detection unit includes a current transformer having a primary side and a secondary side configured to have the current flow through the primary side and be converted by the secondary side to a transformed current, the measured current value being representative of the transformed current.

10. The electronic trip unit as recited in claim 9, wherein a current transforming ratio between the primary side and the secondary side defines a nominal-current range associated with the transformer, the nominal-current range having a maximum nominal current $I_{nenn,max}$, and wherein the predefined trip threshold is eight limes $I_{nenn,max}$.

11. The electronic trip unit as recited in claim 9, wherein the current transformer is configured for setting the current transforming ratio in a plurality of steps, each of the plurality of steps corresponding to a primary side nominal-current range, a secondary side current range being the same for each step.

12. The electronic trip unit as recited in claim 9, wherein the at least one detection unit includes:
   a rectifier coupled to the secondary-side of the transformer and configured to rectify the transformed current so as to provide a rectified current;
   a second resistor coupled between the rectifier and a ground point so that the rectified current flows through the second resistor resulting in a second voltage drop across the second resistor, the second voltage drop representing the measured current value; and
   an output configured to output the second voltage drop.

13. The electronic trip unit as recited in claim 12, wherein the rectifier is a bridge rectifier having an output configured to provide a supply voltage.

14. The electronic trip unit as recited in claim 12, wherein the discriminator circuit includes an input coupled to a Zener diode, and the output of the at least one detection unit being coupled to the input of the discriminator circuit.

15. The electronic trip unit as recited in claim 14, wherein the at least one current includes first and second currents and wherein the at least one detection unit includes first and second detection units, each of the detection units having an output and being configured to respectively sense a respective one of the two currents, and further comprising a decoupling element coupled between the output of each of the detection units and an input of the discriminator circuit.

16. The electronic trip unit as recited in claim 15, wherein the decoupling element includes a diode.

17. The electronic trip unit as recited in claim 6, wherein the microcontroller is configured to receive the measured current value and to shut off the electric motor via the tripping device based on at least one of the measured current value and a nominal current associated with the electric motor.

18. The electronic trip unit as recited in claim 1, wherein the voltage-limiting component includes a Zener diode.

* * * * *